US012650673B2

(12) United States Patent
Miyoshi

(10) Patent No.: US 12,650,673 B2
(45) Date of Patent: Jun. 9, 2026

(54) CONTROL DEVICE AND CONTROL SYSTEM

(71) Applicant: FANUC CORPORATION, Yamanashi (JP)

(72) Inventor: Takashi Miyoshi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 342 days.

(21) Appl. No.: 18/567,771

(22) PCT Filed: Jun. 16, 2021

(86) PCT No.: PCT/JP2021/022927
§ 371 (c)(1),
(2) Date: Dec. 7, 2023

(87) PCT Pub. No.: WO2022/264336
PCT Pub. Date: Dec. 22, 2022

(65) Prior Publication Data
US 2024/0272606 A1 Aug. 15, 2024

(51) Int. Cl.
G05B 19/406 (2006.01)
G05B 19/4061 (2006.01)

(52) U.S. Cl.
CPC ............... G05B 19/4061 (2013.01); *G05B 2219/49141* (2013.01)

(58) Field of Classification Search
USPC .......................................................... 700/178
See application file for complete search history.

(56) References Cited

U.S. PATENT DOCUMENTS

| 2008/0024083 A1* | 1/2008 | Yamaguchi | ........ G05B 19/4061 |
| | | | 318/569 |
| 2011/0035044 A1 | 2/2011 | Takahashi et al. | |
| 2017/0205805 A1* | 7/2017 | Shih | ................... G05B 19/4097 |

FOREIGN PATENT DOCUMENTS

| CN | 102016733 A | 4/2011 |
| CN | 103105819 A | 5/2013 |

(Continued)

OTHER PUBLICATIONS

CN_104126108_A (Year: 2014).*

*Primary Examiner* — Hien D Khuu
(74) *Attorney, Agent, or Firm* — HAUPTMAN HAM, LLP

(57) ABSTRACT

The control device controls industrial machinery. The control device includes a command analysis unit that analyzes blocks of a control program and creates command data that are based on the command of a given block; a safe operation command storage unit that stores, in advance, command data of a safe operation for transitioning the operating status of industrial machinery into a prescribed safe state; a receiving-interval-monitoring unit that monitors the receiving interval of periodically transmitted information transmitted from the PC; and a receiving-interval-determining unit that compares the receiving interval of the periodically transmitted information with a predetermined prescribed threshold value, and determines whether the receiving interval exceeds the threshold value, either the command data created by the command analysis unit or the command data of the safe operation stored in the safe operation command storage unit being outputted based on of the determination results of the receiving-interval-determining unit.

8 Claims, 3 Drawing Sheets

(56)          References Cited

FOREIGN PATENT DOCUMENTS

| JP | H1133867  | A | * | 2/1999 |
|----|-----------|---|---|--------|
| JP | 2006-072399 | A |   | 3/2006 |
| JP | 2008-027376 | A |   | 2/2008 |
| JP | 2014-059607 | A |   | 4/2014 |
| JP | 2014-191724 | A |   | 10/2014 |

* cited by examiner

Figure 1:
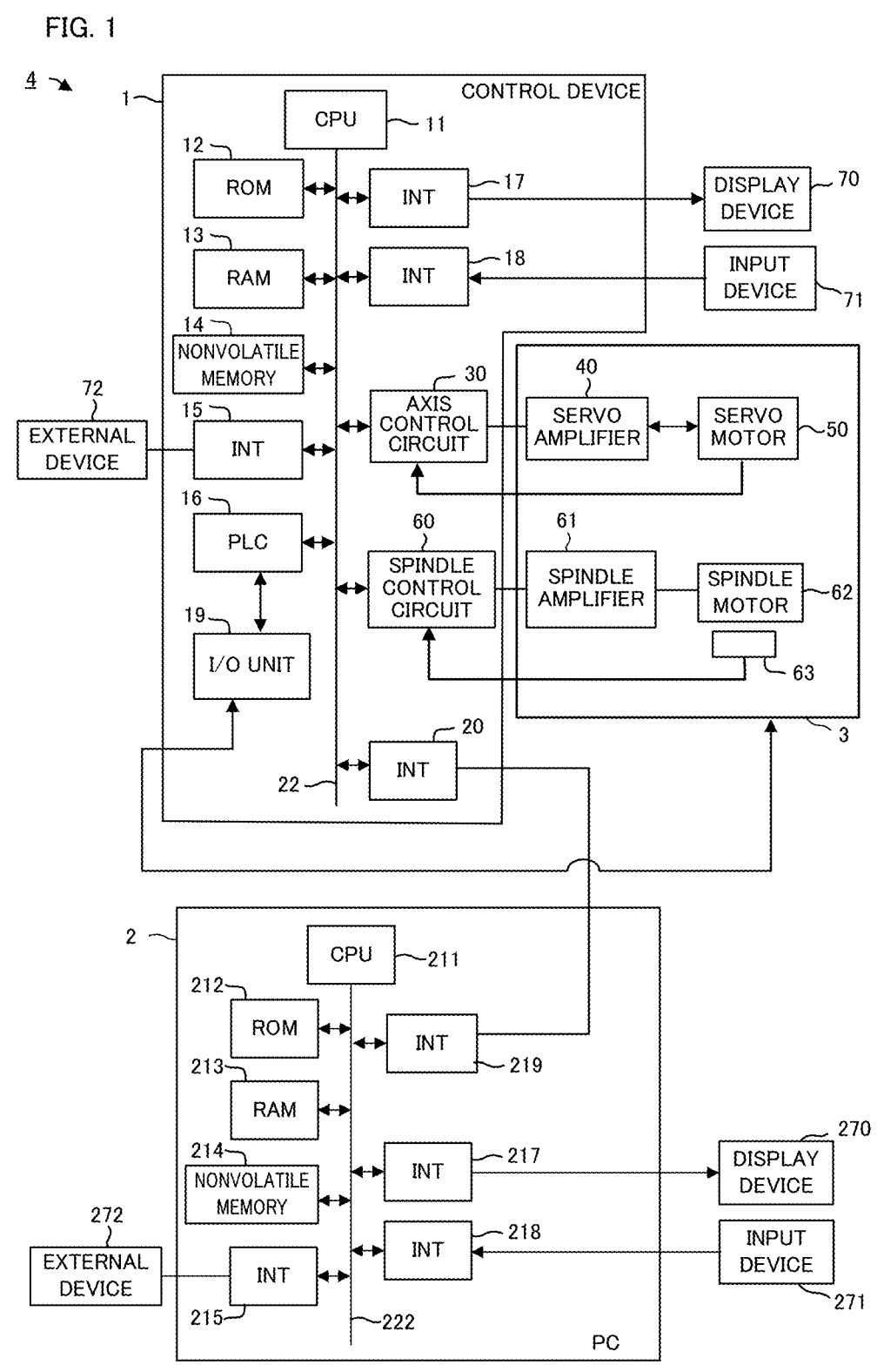

1                                                              CONTROL DEVICE

CPU — 11

12
ROM ⟷ INT — 17 → DISPLAY DEVICE — 70

13
RAM ⟷ INT — 18 ← INPUT DEVICE — 71

14
NONVOLATILE MEMORY 30                    40
AXIS CONTROL CIRCUIT → SERVO AMPLIFIER → SERVO MOTOR — 50

72
EXTERNAL DEVICE

15
INT

16
PLC 60                    61
SPINDLE CONTROL CIRCUIT → SPINDLE AMPLIFIER → SPINDLE MOTOR — 62

63

19
I/O UNIT

20
INT

22

3

2

CPU — 211

212
ROM ⟷ INT — 219

213
RAM

214
NONVOLATILE MEMORY ⟷ INT — 217 → DISPLAY DEVICE — 270

272
EXTERNAL DEVICE — INT ⟷ INT — 218 ← INPUT DEVICE — 271

215                  222

PC

CONTROL DEVICE AND CONTROL SYSTEM

RELATED APPLICATIONS

The present application is a National Phase of International Application Number PCT/JP2021/022927, filed Jun. 16, 2021.

TECHNICAL FIELD

The present invention relates to a control device and a control system, in particular, relates to a control device and a control system that cooperate with a cooperative application operating on general-purpose OS of a PC.

BACKGROUND ART

There have been an increasing number of cases where advanced applications are implemented on general-purpose operating system (OS) of a personal computer (PC) because of limitation of hardware resources of control devices. Such advanced applications may be, for example, an application of a machine collision prevention function (interference check), an application of monitoring peripheral equipment (such as detection of breakage of a tool, for example), a machine learning application, or the like running during machining. By executing these applications on the general-purpose OS at a high rate so that processing is in time for real-time processing on the control device, it is possible to implement control based on the result of the processing.

For example, when a machine collision prevention function is used, information on a forward position during machining is transmitted from the control device to the PC. Interference check based on a forward position is then performed on the PC side. Then, when occurrence of interference is detected, the detection is transmitted to the control device. The control device stops motion of a machining axis based on the result of interference check transmitted from the PC.

CITATION LIST

Patent Literature

Patent Literature 1: Japanese Patent Application Laid-Open No. 2008-027376

SUMMARY OF INVENTION

Technical Problem

Real-time performance of processing performed by an application is not guaranteed in general-purpose OS that does not guarantee real-time performance. Thus, transmission of a processing result from a PC may not be in time with respect to a processing execution request from a control device. For example, if a signal indicating detection of interference is unable to be transmitted from the PC to the control device side, the control device is forced to continue machining with the interference check left substantially disabled. Further, this may cause a moving part of the machine to collide with an interfering object such as a workpiece or a jig in the worst case.

Accordingly, there is a demand for a mechanism that causes a control device to monitor the processing status of an application operating on general-purpose OS.

Solution to Problem

The control system according to the present disclosure periodically transmits information about processing of an application that cooperates with control of an industrial machine operating on general-purpose OS of a PC (hereafter, referred to as a cooperative application) to a control device. The control device monitors time intervals at which the information is transmitted from the PC and, if a time interval exceeds a predetermined threshold defined in advance, determines that the processing on the PC side is delayed with respect to the control device. Then, in response to the determination of the delay, the control device performs control based on a control instruction of a safety operation registered in advance, such as an operation to stop machine operation, an operation to suppress the moving speed, a retract and standby operation, or the like.

The present disclosure achieves the above object.

Further, one aspect of the present disclosure is a control device that controls an industrial machine based on a control program, the control device controls the industrial machine in cooperation with a cooperative application that is an application operating on general-purpose OS of a PC and is related to control of the industrial machine, and the control device includes: an instruction analysis unit that analyzes a block of the control program to create instruction data based on an instruction of the block; a safety operation instruction storage unit that stores in advance instruction data on a safety operation for transferring an operation state of the industrial machine to a predetermined a safe state; reception interval monitoring unit that monitors a reception interval of periodically transmitted information created in a process related to the cooperative application transmitted from the PC; a reception interval determination unit that compares the reception interval of periodically transmitted information with a predetermined threshold defined in advance and determines whether or not the reception interval exceeds the threshold; a control instruction selection unit that, based on a determination result from the reception interval determination unit, selects use of instruction data created by the instruction analysis unit for control of the industrial machine when the reception interval is less than or equal to the threshold and selects use of instruction data on a safety operation stored in the safety operation instruction storage unit for control of the industrial machine when the reception interval exceeds the threshold; and a control unit that controls the industrial machine based on the instruction data selected by the control instruction selection unit.

Another aspect of the present disclosure is a control system formed of a control device and a PC in cooperation, the control device controls an industrial machine based on a control program, and the PC on which a cooperative application that is an application operating on general-purpose OS and is related to control of the industrial machine is running. In the control system, the control device include an instruction analysis unit that analyzes a block of the control program to create instruction data based on an instruction of the block, a safety operation instruction storage unit that stores in advance instruction data on a safety operation for transferring an operation state of the industrial machine to a predetermined safe state, a reception interval monitoring unit that monitors a reception interval of periodically transmitted information created in a process related to the cooperative application transmitted from the PC, a reception interval determination unit that compares the reception interval of periodically transmitted information with a predetermined threshold defined in advance and determines whether or not the reception interval exceeds the threshold, a control instruction selection unit that, based on a determination result from the reception interval determination unit, selects use of instruction data created by the instruction analysis unit for control of the industrial machine when the reception interval is less than or equal to the threshold and selects use of instruction data on a safety operation stored in the safety operation instruction storage unit for control of the industrial machine when the reception interval exceeds the threshold, and a control unit that controls the industrial machine based on the instruction data selected by the control instruction selection unit, and the PC includes a state monitoring unit that, to perform processing of the cooperative application, transmits request information for reading at least any one of a state related to the control device or a state related to the industrial machine to the control device and, based on a result of the transmission, monitors at least any one of the state related to the control device or the state related to the industrial machine, and a processing result transmission unit that transmits a result of processing of the cooperative application to the control device.

Advantageous Effects of Invention

According to one aspect of the present disclosure, when a cooperative application on a PC side operating on general-purpose OS is used, the problem such as operation delay or hangup on the PC side can be suppressed to less affect a machine operation.

BRIEF DESCRIPTION OF DRAWINGS

FIG. 1 is a schematic hardware configuration diagram of a control system according to one embodiment of the present invention.

DESCRIPTION OF EMBODIMENTS

Figure 2:
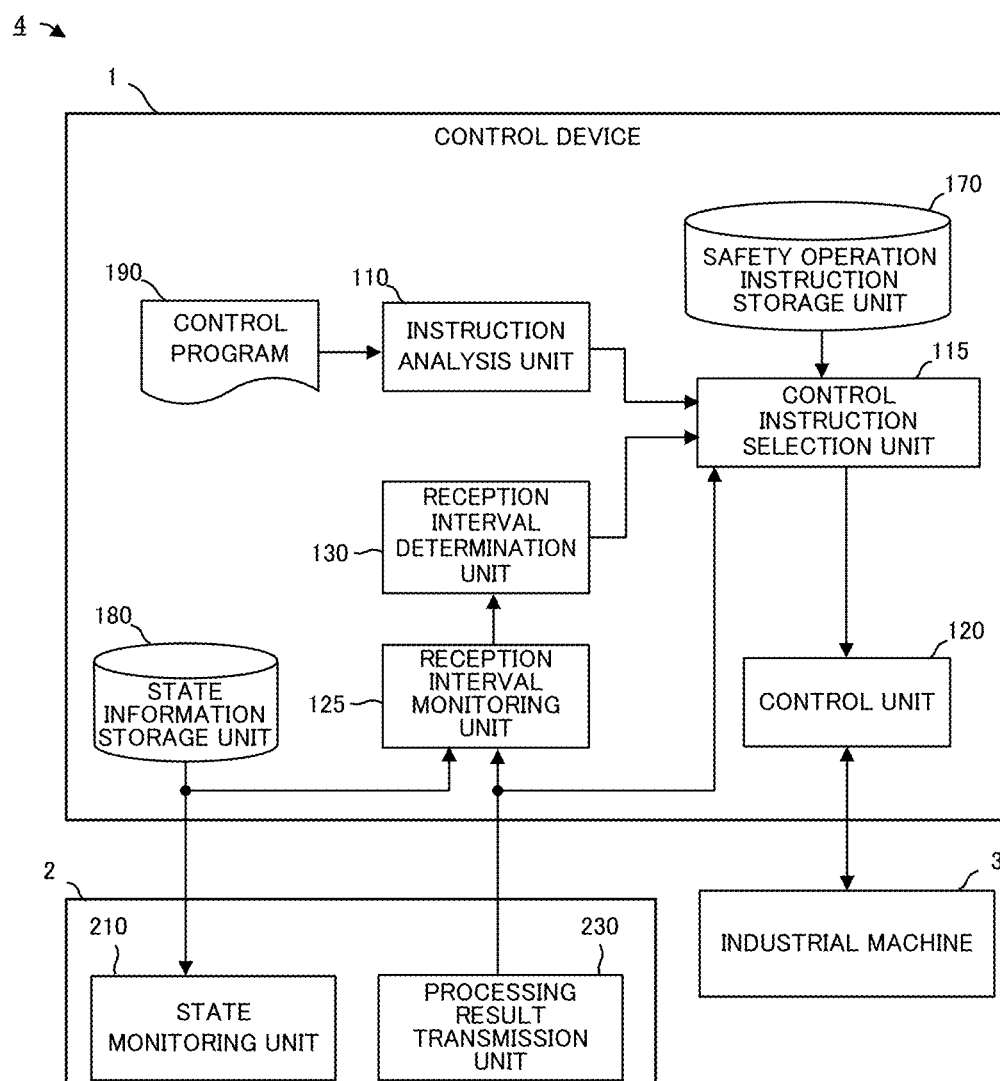
FIG. 2 is a schematic block diagram illustrating functions of the control system according to one embodiment of the present invention.

An embodiment of the present invention will be described below with reference to the drawings.

FIG. 1 is a schematic hardware configuration diagram illustrating a main part of a control device according to one embodiment of the present invention. A control device 1 of the present invention forms a control system 4 together with a PC 2 that is a personal computer attached to the control device 1. The control device 1 controls an industrial machine 3 such as a machine tool or a machining center, for example. In the following, description will be provided as the control device 1 being in cooperation with a cooperative application that provides a machine collision prevention function (interference check function) operating on general-purpose OS of the PC 2.

A CPU 11 of the control device 1 according to the present embodiment is a processor that entirely controls the control device 1. The CPU 11 reads a system program stored in a ROM 12 via a bus 22 and controls the overall control device 1 in accordance with the system program. A RAM 13 temporarily stores temporary calculation data or display data, various data input from outside, and the like.

A nonvolatile memory 14 is formed of a memory, a solid state drive (SSD), or the like backed up by a battery (not illustrated), for example, and the storage state is maintained even when the control device 1 is powered off. The non-volatile memory 14 stores a control program or data loaded from an external device 72 via an interface 15, a control program or data input from an input device 71 via an interface 18, a control program or data acquired from other devices such as a fog computer 6 or a cloud server 7 via a network 5, or the like. The data stored in the nonvolatile memory 14 may include, for example, data on a machine configuration of the industrial machine 3, data on an interfering object such as a workpiece or a jig, data on motion of a moving part along each axis, other data on respective physical quantities detected by sensors (not illustrated) mounted on the industrial machine 3, or the like. The control program or data stored in the nonvolatile memory 14 may be loaded into the RAM 13 during execution/during use. Further, various system programs such as a known analysis program are written in the ROM 12 in advance.

The interface 15 is an interface for connecting the CPU 11 of the control device 1 and the external device 72 such as an external storage medium to each other. From the external device 72 side, for example, a control program, setup data, or the like used for control of the industrial machine 3 are loaded. Further, a control program, setup data, or the like edited in the control device 1 can be stored in an external storage medium such as a CF card, a USB memory, or the like (not illustrated) via the external device 72. A programmable logic controller (PLC) 16 executes a ladder program to control the industrial machine 3 and peripheral devices (for example, a tool exchanger, an actuator such as a robot, a sensor mounted on the industrial machine 3, or the like) of the industrial machine 3 by inputting and outputting signals via an I/O unit 19. Further, the PLC 16 receives signals from various switches on an operation panel, a peripheral device, or the like deployed to the body of the industrial machine 3, performs required signal processing on the signals, and then transmits the signals to the CPU 11.

An interface 20 is an interface for connecting a CPU of the control device 1 and the PC 2 via a wired or wireless connection. The connection between the control device 1 and the PC 2 may be a connection for communication using a technology such as serial communication such as RS-485, Ethernet (registered trademark) communication, optical communication, a wireless LAN, Wi-Fi (registered trademark), Bluetooth (registered trademark), or the like, for example. The control device 1 transfers data interactively with the PC 2 via the interface 20.

Various data loaded onto the memory, data obtained as a result of execution of a program or the like, or the like are output and displayed on a display device 70 via an interface 17. Further, the input device 71 formed of a keyboard, a pointing device, or the like transmits an instruction, data, or the like based on an operation performed by an operator to the CPU 11 via the interface 18.

An axis control circuit 30 for moving a moving part of the industrial machine 3 receives motion instruction amounts from the CPU 11 and outputs motion instructions to servo amplifiers 40, respectively. The servo amplifiers 40 receive these instructions and drive servo motors 50 of the industrial machine 3, respectively. Each servo motor 50 has a built-in position and velocity detector and feeds a position and velocity feedback signal from the position and velocity detector back to the axis control circuit 30 to perform feedback control of the position and velocity. Note that, although only one axis control circuit 30, one servo amplifier 40, and one servo motor 50 are illustrated in the hardware configuration diagram of FIG. 1, these components may be provided for the same number as that of moving parts of the industrial machine 3 to be controlled in the actual implementation.

A spindle control circuit 60 receives a spindle rotation instruction and outputs a spindle speed signal to a spindle amplifier 61. The spindle amplifier 61 receives the spindle speed signal and rotates a spindle motor 62 of the industrial machine at the instructed rotational rate to drive a tool. A position coder 63 is coupled to the spindle motor 62, the position coder 63 outputs feedback pulses in synchronization with rotation of the spindle, and the feedback pulses are read by the CPU 11.

On the other hand, the PC 2 according to the present embodiment is attached to the control device 1. A CPU 211 of the PC 2 is a processor that entirely controls the PC 2. The CPU 211 reads a system program stored in a ROM 212 via a bus 222 and controls the overall PC 2 in accordance with the system program. A RAM 213 temporarily stores temporary calculation data or display data, various data input from outside, and the like.

A nonvolatile memory 214 is formed of a memory, a solid state drive (SSD), or the like backed up by a battery (not illustrated), for example, and the storage state is maintained even when the PC 2 is powered off. The nonvolatile memory 214 stores data acquired from the control device 1 via an interface 219, data or a program loaded from an external device 272 via an interface 215, data or a program input via an input device 271, or the like. The data or the program stored in the nonvolatile memory 214 may be loaded into the RAM 213 during execution/during use. Further, various system programs such as a known processing program or analysis program, 3D simulation program, a machine collision prevention application program, or the like are written in the ROM 212 in advance.

The interface 215 is an interface for connecting the CPU 211 of the PC 2 and the external device 272 such as an USB device to each other. From the external device 272 side, for example, a program, respective parameters, or the like used for analysis can be loaded. Further, a program, respective parameters, or the like edited in the PC 2 can be stored in an external storage unit via the external device 272.

The interface 219 is an interface for connecting the CPU 211 of the PC 2 and the control device 1 via a wired or wireless connection. The PC 2 transfers data interactively with the control device 1 via the interface 219.

Various data loaded onto the memory, data obtained as a result of execution of a control program, a system program, or the like, or the like are output and displayed on a display device 270 via an interface 217. Further, the input device 271 formed of a keyboard, a pointing device, or the like transmits an instruction, data, or the like based on an operation performed by an operator to the CPU 211 via the interface 218.

FIG. 2 illustrates the functions of the control device 1 and the PC 2 according to a first embodiment of the present invention as a schematic block diagram. Respective functions of the control device 1 according to the present embodiment are implemented when the CPU 11 of the control device 1 illustrated in FIG. 1 executes the system program to control the operations of respective units of the control device 1. Further, respective functions of the PC 2 according to the present embodiment are implemented when the CPU 211 of the PC 2 illustrated in FIG. 1 executes the system program to control the operations of respective units of the PC 2.

The control device 1 of the present embodiment includes an instruction analysis unit 110, a control instruction selection unit 115, a control unit 120, a reception interval monitoring unit 125, and a reception interval determination unit 130. Further, the PC 2 includes a state monitoring unit 210, an application execution unit 220, and a processing result transmission unit 230.

Furthermore, the RAM 13 or the nonvolatile memory 14 of the control device 1 is provided with a safety operation instruction storage unit 170, which is an area for storing an instruction related to an safety operation of the industrial machine 3 in advance, and a state information storage unit 180, which is an area for storing information indicating the control state of the industrial machine 3 caused by the control device 1, and stores a control program 190 used for control of the industrial machine 3 in advance.

The instruction analysis unit 110 reads instructions block by block from the control program 190 and analyzes the instruction to create data in an execution format. The instruction analysis unit 110 outputs instruction data in an execution format to the control instruction selection unit 115.

While the reception interval determination unit 130 determines that the reception interval of information periodically transmitted from the PC and created in a process of an application that cooperates with control of the industrial machine 3 (hereafter, referred to as periodically transmitted information) is less than or equal to a predetermined threshold defined in advance, the control instruction selection unit 115 outputs instruction data in the execution format, which is created by the instruction analysis unit 110 analyzing an instruction, to the control unit 120. Further, when the reception interval determination unit 130 determines that the reception interval of the periodically transmitted information transmitted from the PC 2 exceeds the predetermined threshold defined in advance, the control instruction selection unit 115 outputs instruction data related to a safety operation instruction, which is read from the safety operation instruction storage unit 170, to the control unit 120. Note that the periodically transmitted information, that is, information created in a process of the cooperative application includes a request instruction that is created by the cooperative application to acquire information required for the process or information that is created and output by the cooperative application.

The safety operation instruction storage unit 170 stores in advance instruction data related to a safety operation for shifting the operation state of the industrial machine 3 to a predetermined safe state. Examples of the safety operation may be, for example, a stop operation to safely stop operation of the industrial machine 3, a speed suppression operation to reduce moving speed of a moving part of the industrial machine 3, a retract and standby operation to retract a tool from a workpiece to stand by, a switching operation to switch a function cooperating with the PC 2 to a function installed in the control device 1, or the like. The instruction data related to these safety operations may be created in accordance with the property of the industrial machine 3 to be controlled or in accordance with the content of the control program 190 and stored in the safety operation instruction storage unit 170 in advance.

The control instruction selection unit 115 may output, to the control unit 120, information about a processing result of the cooperative application transmitted from the PC 2 in addition to the instruction data in the execution format created by the instruction analysis unit 110 when the reception interval is determined to be less than or equal to the predetermined threshold defined in advance. For example, it is assumed that the cooperative application of the machine collision prevention function is operating on the PC 2, and a result of interference check applied between a moving part such as a spindle, a tool, or the like and an interfering object such as a workpiece, a jig, a table, or the like is periodically transmitted. In such a case, the control instruction selection unit 115 outputs the result of interference check in addition to the instruction data in the execution format created by the instruction analysis unit 110 to the control unit 120.

The control unit 120 controls the industrial machine 3 based on data related to an instruction input from the control instruction selection unit 115. For example, in response to input of instruction data for moving or stopping a moving part of the industrial machine 3 along an axis, the control unit 120 outputs motion instruction data for driving the servo motor 50 that drives the axis. Further, for example, in response to input of instruction data for rotating or stopping the spindle of the industrial machine 3, the control unit 120 outputs rotation instruction data for controlling the spindle motor 62. In addition, the control unit 120 has a function for general control required for controlling the industrial machine 3 based on input instruction data. Results of processing according to control of the industrial machine 3 performed by the control unit 120 are sequentially stored in the state information storage unit 180. For example, the state information storage unit 180 stores a position or speed of a moving part of the industrial machine 3, a rotation state of the spindle, a type of a tool, the state of peripheral equipment such as a cutting liquid supply device or a machine door, or the like. Further, when the machine collision prevention function operating on the PC 2 side is in cooperation as with the present embodiment, information on a forward position of a moving part subjected to the interference check or the like may be stored in the state information storage unit 180.

When information about a processing g result of a cooperative application transmitted from the PC 2 is input from the control instruction selection unit 115, the control unit 120 may refer to the information and use the information to control the industrial machine 3. For example, it is assumed that the cooperative application of the machine collision prevention function is operating on the PC 2, and a result of interference check applied between a moving part such as a spindle, a tool, or the like and an interfering object such as a workpiece, a jig, a table, or the like is periodically transmitted. In such a case, when the result of the interference check transmitted from the PC 2 indicates expected collision between the moving part and the interfering object, the control unit 120 may perform control to stop the operation of the industrial machine 3.

The reception interval monitoring unit 125 monitors reception intervals of the periodically transmitted information transmitted from the PC 2. The reception interval monitoring unit 125 stores a reception time of the periodically transmitted information from the PC 2 as a history. Then, a period that has elapsed from the time of reception of the last transmitted information is output to the reception interval determination unit 130. There may be multiple pieces of periodically transmitted information from the PC 2. For example, as with the present embodiment, when the control device 1 is in cooperation with the machine collision prevention function operating on the PC 2 side, a forward position of the moving part to be subjected to interference check is requested from the PC 2. Further, a result of interference check related to the previously requested forward position is transmitted from the PC 2. The reception interval monitoring unit 125 may separately monitor reception intervals of requests for forward positions and reception intervals of results of interference check, respectively, as the periodically transmitted information.

When the reception interval determination unit 130 determines that a reception interval of the periodically transmitted information transmitted from the reception interval monitoring unit 125 exceeds a predetermined threshold defined in advance, the reception interval determination unit 130 outputs the determination result to the control instruction selection unit 115. This threshold may include a plurality of stepwise values. In such a case, the reception interval determination unit 130 outputs the determination result to the control instruction selection unit 115 so that it is possible to recognize which step of the threshold is exceeded. At that time, instruction data on different safety operations corresponding to the steps of the threshold are stored in the safety operation instruction storage unit 170 in advance. Further, the control instruction selection unit 115 may output the instruction data on different safety operations to the control unit 120 in accordance with which step of the threshold is exceeded.

Further, when the reception interval monitoring unit 125 monitors multiple pieces of periodically transmitted information, different thresholds may be set for respective pieces of periodically transmitted information. Also in such a case, instruction data on different safety operations corresponding to the type of the periodically transmitted information may be stored in the safety operation instruction storage unit 170 in advance, and the control instruction selection unit 115 may output instruction data on different safety operations to the control unit 120 in accordance with which periodically transmitted information exceeds the threshold.

Although the predetermined threshold used by the reception interval determination unit 130 may be set in advance as one or more fixed values as described above, the predetermined threshold may be set dynamically in accordance with the situation. For example, as with the control device 1 according to the present embodiment, when a cooperative application of the machine collision prevention function operating on the PC 2 is in cooperation, the PC 2 acquires a forward position and transmits a result of interference check at the position. Thus, it is required to receive the result of interference check before a time that the moving part of the industrial machine 3 reaches the forward position (hereafter, referred to as a preceding time) and by a time that the moving part can stop before interfering. Accordingly, the threshold used by the reception interval determination unit 130 is dynamically calculated based on a preceding time. More specifically, a value obtained by multiplying a predetermined coefficient (<1.0) by the preceding time is used as the threshold. With such a configuration, it is possible to dynamically set a suitable threshold for the forward position that changes in accordance with a situation.

On the other hand, the state monitoring unit 210 of the PC 2 according to the present embodiment periodically monitors the state of the control device 1. For example, the state monitoring unit 210 requests predetermined information stored in the state information storage unit 180 of the control device 1 and then outputs, to the application execution unit 220, information about the state of the control device 1 obtained as a response to the request. For example, when the control device 1 as with the present embodiment is in cooperation with the machine collision prevention function operating on the PC 2 side, the state monitoring unit 210 requests the control device 1 for a forward position of the moving part of the industrial machine 3 to be subjected to the interference check and outputs the forward position of the moving part obtained as a result thereof to the application execution unit 220.

The application execution unit 220 operates various application programs on the general-purpose OS. The cooperative application executed in the application execution unit 220 may perform processing using information input from the state monitoring unit 210. Further, the cooperative application may output the processing result to the processing result transmission unit 230. For example, the application execution unit 220 of the present embodiment executes an application program that provides a machine collision prevention function. The machine collision prevention function checks interference between a moving part and an interfering object such as a workpiece, a jig, a table, or the like based on a forward position of the moving part of the industrial machine 3 input from the state monitoring unit 210 and then outputs the result of the interference check to the processing result transmission unit 230.

The processing result transmission unit 230 transmits a result of processing of the cooperative application performed by the application execution unit 220 to the control device 1. For example, the processing result transmission unit 230 of the present embodiment transmits an execution result of interference check performed by the cooperative application of the machine collision prevention function to the control device 1.

Figure 3:
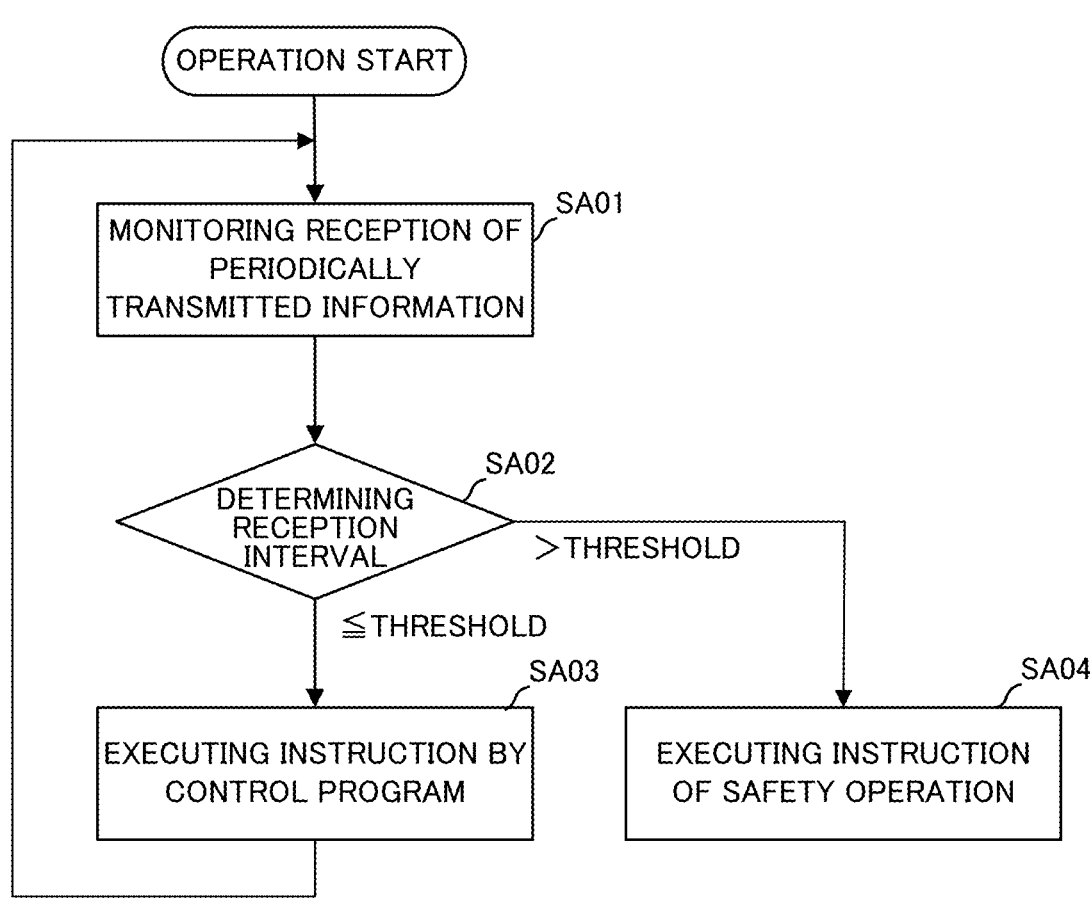
FIG. 3 is a schematic flowchart illustrating a flow of the operation of the control system according to one embodiment of the present invention.

FIG. 3 is a schematic flowchart illustrating a flow of the operation in the control device 1 according to the present embodiment having the above configuration.

Once a cooperative operation between the control device 1 and a machine collision prevention function operating on the PC 2 is started, the reception interval monitoring unit 125 monitors a request for a forward position from the state monitoring unit 210 of the PC 2 and transmission of an interference check result from the processing result transmission unit 230, respectively, as periodically transmitted information (step SA01).

The reception interval determination unit 130 compares respective reception intervals of the periodically transmitted information monitored by the reception interval monitoring unit 125 with predetermined thresholds respectively defined in advance (step SA02). If all the reception intervals are less than or equal to the thresholds, the control instruction selection unit 115 outputs, to the control unit 120, instruction data in an execution format created by the instruction analysis unit 110 and a processing result of interference check transmitted from the PC 2. The control unit 120 controls the industrial machine 3 in accordance with the instruction data and the processing result of the interference check that have been input (step SA03).

In contrast, if either one of the reception intervals of the periodically transmitted d information exceeds the threshold as a result of determination performed by the reception interval determination unit 130, the control instruction selection unit 115 outputs instruction data on a safety operation to be stored in the safety operation instruction storage unit 170 to the control unit 120. The control unit 120 controls the industrial machine 3 to take a safety operation in accordance with the input instruction data (step SA04). After execution of the safety operation, the operation of the industrial machine 3 is continued or the operation of the industrial machine 3 is suspended in accordance with the detail of the safety operation.

In the control device 1 having the above configuration, when the reception intervals of periodically transmitted information periodically transmitted from the PC 2 are getting delayed, the control of the industrial machine 3 can be transferred to a safety operation. Accordingly, when a cooperative application on the PC side operating on general-purpose OS is used, the problem such as operation delay or hangup on the PC side can be suppressed to less affect the machine operation. By providing the thresholds used in determination of the reception interval in a stepwise manner, it is possible to apply a flexible measure such as suppressing the moving speed of a moving part of the industrial machine 3 in a stepwise manner and finally stopping the moving part when the reception interval of the periodically transmitted information exceeds a threshold, for example. If the delay in processing on the PC 2 side is temporary, it is also possible to deal with the delay without immediately stopping the operation of the industrial machine 3. By providing different safety operations in accordance with a type of periodically transmitted information, it is possible to apply a flexible measure such as switching each function that is no longer receivable to the internal function of the control device 1, setting safety operations different for information which causes a fatal result if the information is no longer receivable and information which causes no fatal result and does not affect a continued operation of the industrial machine 3 even if the information is no longer receivable, or the like, for example.

As a modified example for the control device 1 according to the present embodiment, the control instruction selection unit 115 may output, to the control unit 120, instruction data related to different safety operations in accordance with the state of the control device 1, the state of the industrial machine 3, the state of peripheral equipment, or the like when the reception interval determination unit 130 determines that the reception interval of the periodically transmitted information transmitted from the PC 2 exceeds a predetermined threshold defined in advance. In such a case, the safety operation instruction storage unit 170 stores in advance instruction data on a plurality of safety operations corresponding to the control states of the control device 1, respectively. This enables the control instruction selection unit 115 to select different safety operations in accordance with the position or speed of the moving part of the industrial machine 3 read from the state information storage unit 180, the rotation state of the spindle, the type of a tool, the state or the like of peripheral equipment such as a cutting liquid supply device or a machine door, the execution block number of the control program 190, the load state of the servo motor 50 or the spindle motor 62 fed back from the industrial machine 3, or the like.

Although the embodiment of the present invention has been described above, the present invention is not limited to only the examples of the embodiment described above and can be implemented in various forms with addition of a suitable change.

For example, the example in which the control device 1 cooperates with cooperative application of a machine collision prevention function operating on the PC 2 side has been described in the above embodiment. However, other cooperative applications can be in cooperation. For example, a cooperative application for detecting tool breakage may be operated at the PC 2, the peripheral device such as a sensor of the industrial machine 3 may be connected to the PC 2, and the cooperative application can also be adapted for a case of detecting the tool breakage state on the PC 2 side. In such a case, the tool breakage state can be periodically transmitted from the PC 2 side to the control device 1, and this information can be monitored by the reception interval monitoring unit 125 of the control device 1 as the periodically transmitted information.

Further, it is conceivable that a cooperative application related to machine learning is executed at the PC 2 and this cooperative application cooperates with the control device 1. For example, a plurality of cameras or the like are used to capture an image of the inside and the peripheral of the industrial machine 3, the captured moving image are used to analyze the operation state or the peripheral state by the machine learning application on the PC 2, and the analysis result is transmitted to the control device 1. In such a case, the industrial machine 3 may be caused to take a safety operation when the transmission of the analysis result from the PC 2 is delayed.

LIST OF REFERENCE SYMBOLS 1 control device
2 PC
3 industrial machine
4 control system
5 network
6 fog computer
7 cloud server
11 CPU
12 ROM
13 RAM
14 nonvolatile memory
15, 17, 18, 20 interface
19 I/O unit
22 bus
30 axis control circuit
40 servo amplifier
50 servo motor
60 spindle control circuit
61 spindle amplifier
62 spindle motor
63 position coder
70 display device
71 input device
72 external device
110 instruction analysis unit
115 control instruction selection unit
120 control unit
125 reception interval monitoring unit
130 reception interval determination unit
170 safety operation instruction storage unit
180 state information storage unit
190 control program
211 CPU
212 ROM
213 RAM
214 nonvolatile memory
215, 217, 218, 219 interface
222 bus
270 display device
271 input device
272 external device
210 state monitoring unit
220 application execution unit
230 processing result transmission unit

The invention claimed is:

1. A control device that controls an industrial machine based on a control program, wherein the control device controls the industrial machine in cooperation with a cooperative application that is an application operating on general-purpose OS of a PC and is related to control of the industrial machine, the control device comprising:

an instruction analysis unit that analyzes a block of the control program to create instruction data based on an instruction of the block;

a safety operation instruction storage unit that stores in advance instruction data on a safety operation for shifting an operation state of the industrial machine to a predetermined safe state;

a reception interval monitoring unit that monitors a reception interval of periodically transmitted information created in a process related to the cooperative application transmitted from the PC;

a reception interval determination unit that compares the reception interval of periodically transmitted information with a predetermined threshold defined in advance and determines whether or not the reception interval exceeds the threshold;

a control instruction selection unit that, based on a determination result from the reception interval determination unit, selects use of instruction data created by the instruction analysis unit for control of the industrial machine when the reception interval is less than or equal to the threshold and selects use of instruction data on a safety operation stored in the safety operation instruction storage unit for control of the industrial machine when the reception interval exceeds the threshold; and a control unit that controls the industrial machine based on the instruction data selected by the control instruction selection unit.

2. The control device according to claim 1, wherein the cooperative application is an application of a machine collision prevention function that performs interference check based on a forward position, and wherein the periodically transmitted information includes at least result information on the interference check from the cooperative application.

3. The control device according to claim 2, wherein the safety operation is any of a stop operation to safely stop the industrial machine, a speed suppression operation to reduce moving speed of a moving part of the industrial machine, a retract and standby operation to retract a tool of the industrial machine from a workpiece to stand by, or a switching operation for switching to an internal monitoring function of the control device.

4. The control device according to claim 1, wherein instruction data on a plurality of safety operations corresponding to types of the periodically transmitted information, respectively, are stored in the safety operation instruction storage unit in advance, and wherein when the reception interval of the periodically transmitted information exceeds the threshold, the control instruction selection unit selects instruction data on the safety operation in accordance with a type of the periodically transmitted information out of instruction data on the plurality of safety operation stored in the safety operation instruction storage unit.

5. The control device according to claim 1, wherein a plurality of stepwise values are prepared as the threshold, wherein instruction data on a plurality of safety operations corresponding to steps of the threshold, respectively, are stored in the safety operation instruction storage unit in advance, and wherein when the reception interval of the periodically transmitted information exceeds the threshold, the control instruction selection unit selects instruction data on the safety operation in accordance with a step of the threshold out of instruction data on the plurality of safety operation stored in the safety operation instruction storage unit.

6. The control device according to claim 1, wherein the threshold is dynamically calculated based on a state of the control device or a state of the industrial machine.

7. The control device according to claim 1, wherein instruction data on a plurality of safety operations corresponding to a state of the control device or a state of the industrial machine, respectively, are stored in the safety operation instruction storage unit in advance, and wherein when the reception interval of the periodically transmitted information exceeds the threshold, the control instruction selection unit selects instruction data on the safety operation in accordance with the state of the control device or the state of the industrial machine out of instruction data on the plurality of safety operation stored in the safety operation instruction storage unit.

8. A control system formed of a control device and a PC in cooperation, wherein the control device controls an industrial machine based on a control program, and the PC on which a cooperative application that is an application operating on general-purpose OS and is related to control of the industrial machine is running, wherein the control device comprises an instruction analysis unit that analyzes a block of the control program to create instruction data based on an instruction of the block, a safety operation instruction storage unit that stores in advance instruction data on a safety operation for shifting an operation state of the industrial machine to a predetermined safe state, a reception interval monitoring unit that monitors a reception interval of periodically transmitted information created in a process related to the cooperative application transmitted from the PC, a reception interval determination unit that compares the reception interval of periodically transmitted information with a predetermined threshold defined in advance and determines whether or not the reception interval exceeds the threshold, a control instruction selection unit that, based on a determination result from the reception interval determination unit, selects use of instruction data created by the instruction analysis unit for control of the industrial machine when the reception interval is less than or equal to the threshold and selects use of instruction data on a safety operation stored in the safety operation instruction storage unit for control of the industrial machine when the reception interval exceeds the threshold, and a control unit that controls the industrial machine based on the instruction data selected by the control instruction selection unit, and wherein the PC comprises a state monitoring unit that, to perform processing of the cooperative application, transmits request information for reading at least any one of a state related to the control device or a state related to the industrial machine to the control device and, based on a result of the transmission, monitors at least any one of the state related to the control device or the state related to the industrial machine, and a processing result transmission unit that transmits a result of processing of the cooperative application to the control device.

* * * * *